(No Model.)　　　　　　F. G. PROCUNIER.　　　2 Sheets—Sheet 1.
STEAM TRAP.

No. 456,519.　　　　　　　　Patented July 21, 1891.

Witnesses:　　　　　　　　　　　　　Inventor:
Fred Gerlach　　　　　　　　　　　Frank G. Procunier
O. W. Bond (No Model.) 2 Sheets—Sheet 2.

F. G. PROCUNIER.
STEAM TRAP.

No. 456,519. Patented July 21, 1891.

Witnesses:
Fred Gerlach
O. W. Bond

Inventor:
Frank G. Procunier

UNITED STATES PATENT OFFICE.

FRANK G. PROCUNIER, OF CHICAGO, ILLINOIS, ASSIGNOR TO HIMSELF AND EBENEZER HAMILTON, OF SAME PLACE.

STEAM-TRAP.

SPECIFICATION forming part of Letters Patent No. 456,519, dated July 21, 1891.

Application filed March 11, 1891. Serial No. 384,665. (No model.)

*To all whom it may concern:*

Be it known that I, FRANK G. PROCUNIER, residing at Chicago, in the county of Cook and State of Illinois, a subject of the Queen of Great Britain, have invented certain new and useful Improvements in Steam-Traps; and I do hereby declare that the following is a full, clear, and exact description of the invention, which will enable others skilled in the art to which it pertains to make and use the same, reference being had to the accompanying drawings, in which—

Figure 1:
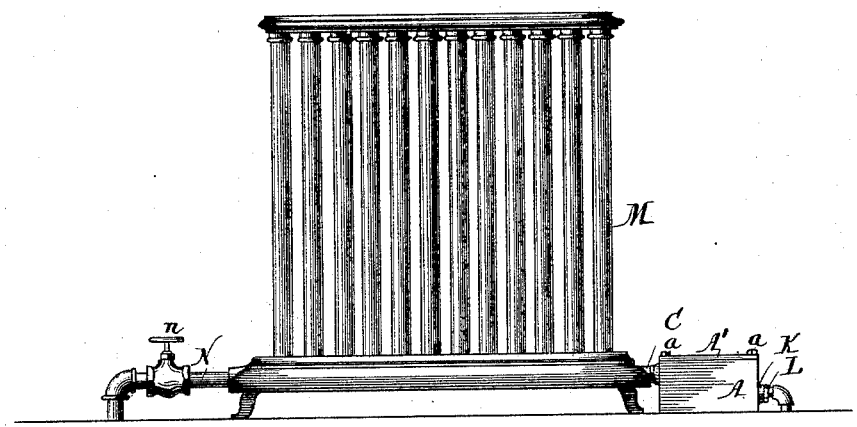
Figure 2:
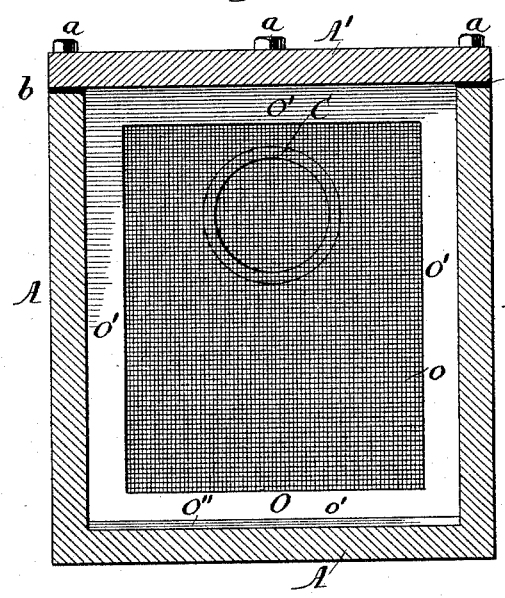
Figure 3:
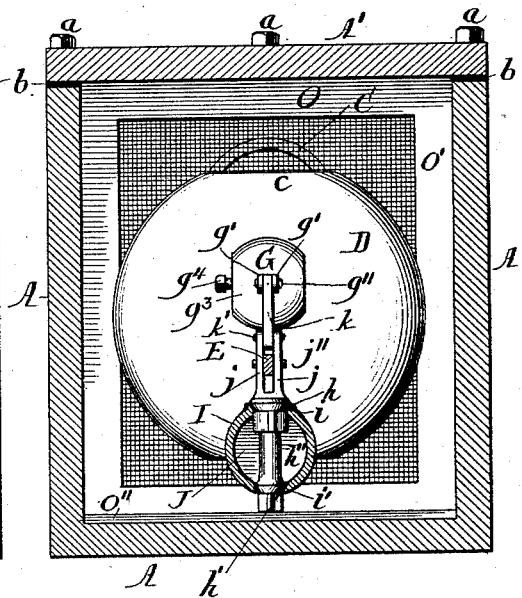
Figure 4:
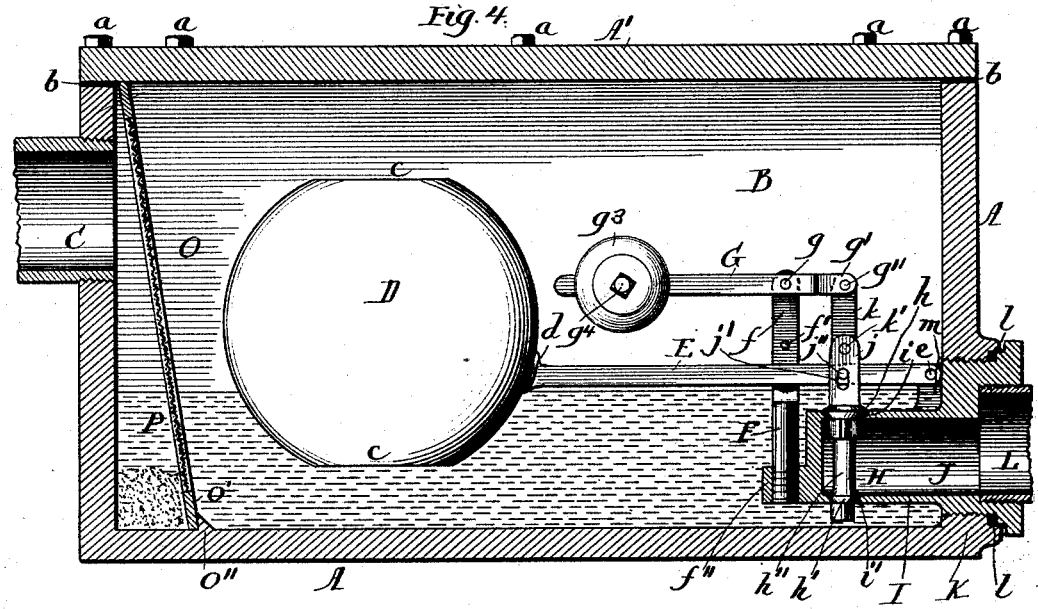
Figure 5:
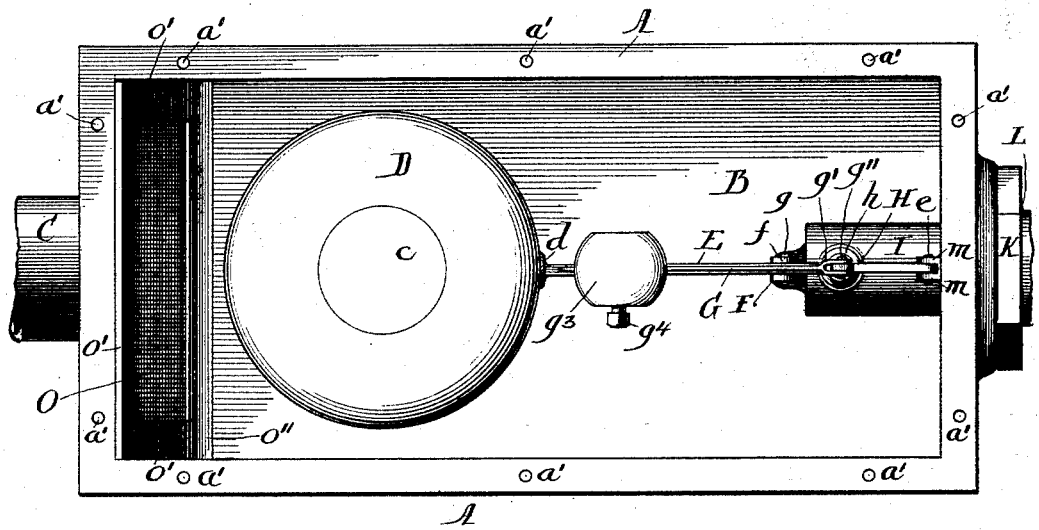

Figure 1 is an elevation showing the trap attached to a radiator-coil. Fig. 2 is a cross-section through the eduction-passage, showing the eduction-valve and the lifting-lever and connections for raising the valve, and showing also the float and its stem. Fig. 3 is a cross-section showing the screen for preventing sediment from entering the chamber of the trap and interfering with the working of the eduction-valve. Fig. 4 is a central longitudinal section through the trap. Fig. 5 is a top or plan view with the cover removed.

This invention relates to that class of steam-traps in which a float actuated by the rise and fall of the water in a receiving-chamber opens and closes an eduction-valve to an eduction-passage for the water of condensation to escape when the valve is open and to shut off the escape of the water when the valve is closed.

The object of the invention is to automatically open the eduction-valve when the float has descended to the point where the valve is closed, and thereby escape the water of condensation entirely, or nearly so, from the trap after the pressure is off therefrom, and to improve generally the construction and operation of the trap; and its nature consists in the several parts and combination of parts hereinafter described, and pointed out in the claims as new.

In the drawings, A represents a shell or case, made of cast-iron or other suitable material, formed into shape to have a closed bottom and inclosing its walls, and having a suitable cover A' attached to walls by screws $a$ or otherwise, with the joint between the corner and case made tight by a suitable packing $b$.

B is a chamber in the shell or case A for receiving the water of condensation.

C is the induction or inlet pipe connecting the trap to a radiator-coil, as shown in Fig. 1, or to other steam-receiving device, the connection being made in any suitable manner.

D is a float in the form of a hollow ball or sphere, flattened at $c$ on opposite sides in the construction shown, but which can be otherwise formed, so as to rise and fall with the rise and fall of the water in the chamber B.

E is a stem, one end of which is screwed or otherwise secured in a socket $d$ on the float D, and the other end is supported by a pin or pivot $e$, so as to allow the float to rise and fall.

F is a post, the lower end of which is screwed into or otherwise secured in an ear or plate $f''$, projecting out from the end wall of the eduction-tube. The upper end of this post F has a slot $f$, in which the stem E is located and held and guided in its rising and falling movements, and, as shown, the rise of the stem E is limited by a stop-pin $f'$, extending across the seat $f$, and, if desired, a series of holes can be provided for this pin $f$, by means of which the rise of the float can be adjusted and be made more or less.

G is a lifting-lever mounted on the upper end of the post F by a pin or pivot $g$, and having at one end a fork $g'$, and carrying at its outer end a sliding weight $g^3$, which can be locked to the lever at any desired point by a set-screw $g^4$.

H is an eduction-valve, consisting in the construction shown of an upper valve $h$ and a lower valve $h'$, connected by a stem $h''$, each being of the form known as "winged valves," which wings serve as guides for keeping the valves in line, and through the open spaces between which water of condensation flows, when the valves are open, into the eduction-passage.

I is a ball or casing, having an eduction-opening $i$, with a seat for the valve $h$, and an eduction-opening $i'$, with a seat for the valve $h'$, and the end of this wall or casing I has the ear or plate $f'$ for the post F. The opening $i$ is of a larger diameter than the valve $h'$, so that the valve $h'$ can be passed through the opening $i$ and seat in the opening $i'$, as shown in Figs. 3 and 4.

J is an eduction in the wall or casing I, with which the openings $i$ and $i'$ communicate. The valve $h$ seats on the outside of the opening $i$, and the valve $h'$ seats on the inside of the opening $i'$, and extending up from the top of the valve $h$ are ears $j$, in each of which is a slot $j'$, which receives a pin $j''$, projecting on each side of the stem E, which pin $j''$ connects the stem E with the valve H, and the slot $j'$ allows the valve $h$ to be moved to the limit of the slot independently of the stem E. The ears $j$ have pivoted between them by a pin or pivot $k'$ a link $k$, the upper end of which is pivoted by the pin or pivot $g''$ between the arms of the fork $g'$, so that by the downward movement of the lifting-lever G the valve will be raised through the connecting-link $k$ without moving the stem E, and such movement is permitted by the space left between the lower edge of the stem E and the bottom of the opening between the ears $j$, as shown in Fig. 3.

K is a plug formed with or suitably secured to the wall or casing I and screw-threaded into the wall of the shell or casing A, and the joint of this plug, at its inner face and the wall of the casing I, is made tight by a suitable packing $l$, as shown in Fig. 4. The inner face of the plug K has ears $m$, between which is pivoted the end of the stem E by the pin or pivot $e$. The plug K, it will thus be seen, carries the wall or casing I, the valve H, the stem E, float D, and also the lifting-lever G through the post F, which is carried by the wall or casing I, so that the working parts of the trap are all carried by this plug K, which enables the parts to be readily placed in position, as by screwing the plug K in place the wall or casing I is entered in the chamber B, and by turning the plug K the openings $i$ and $i'$ and the ears $m$ are brought into position for the insertion of the valve H and the attachment of the stem E. The openings $i$ and $i'$ and the ears $m$ are in line, and the post F is in a center line with the ears $m$, and this post can be screwed or otherwise secured in or to the ear or plate $f''$, which brings the stem E, lifting-lever G, and valve H all in the same line, and as the post F must stand in line with the ears $m$, it will be seen that whether the parts be in a straight vertical line or be at a slight inclination no binding can take place between the stem E and its guide-post F, as the guide-post and the pivoting-point of the stem are always in line, both being carried by the wall or casing I and its plug K.

L is the return-pipe screw-threaded into the plug K and having a free communication with the eduction-passage J.

M is a radiator-coil, to which the trap is connected, as shown in Fig. 1, by the pipe C and a short coupling, so as to locate the trap as close as possible to the radiator-coil.

N is the steam-supply pipe for the radiator-coil, having a shut-off valve $n$, as usual.

O is a screen located at the induction side of the chamber B and inside of such chamber. This screen is formed of a wire-netting $o$, attached to a frame $o'$, and is set inclined with its upper edge against the wall of the chamber B at the top and its lower end against a rib $o''$ on the bottom of the chamber, as shown in Fig. 4.

P is a settling or sediment chamber between the wall of the chamber B and the screen O, and in which the sediment caught by the screen is deposited and kept from entering the chamber B.

The parts are assembled by screwing the plug into the wall of the case A, entering the wall or casing I, with its eduction-passage J in the chamber B, and the plug K is turned to bring the openings $i$ and $i'$ and ears $m$ in a vertical plane, or approximately so. The post F is secured in or to the ear $f''$, and stands in a center line with the openings $i$ and $i'$ and ears $m$. The valve H is dropped into place for the valve $h$ to seat on the opening $i$ and the valve $h'$ to seat on the opening $i'$ by passing the valve $h'$ through the opening $i$. The float D, with the stem E attached thereto, is placed in the chamber B, and the stem E is slipped into the slot $f$ of the post F and into the opening between the ears $j$ of the valve H. The end of the stem E is slipped between the ears $m$ and attached by the pin or pivot $e$. The valve H is attached to the stem E by passing the pin $j''$ through the stem to project on each side into the slot $j'$ of each ear $j$, and the stop-pin $f'$ is inserted through the post F across the slot $f$. The lifting lever G is entered into the slot $f$ of the post F and attached in position by the pin or pivot $g$. The link $k$ is pivoted between the ears $j$ of the valve H by the pin or pivot $k'$, and its upper end is attached between the fork $g'$ by the pin or pivot $g''$, connecting the lifting-lever G to the valve H, and the weight $g^3$ is slipped onto the lever G and adjusted to the proper point on such lever to overbalance the weight of the valve H and the connecting-link $k$ and as much pressure in the trap as it is desired to have the valve H open against, which may be a small amount or none at all. The screen O is slipped onto place with its bottom edge against the rib $o''$ and its top edge against the wall of the casing A, and when thus arranged the trap is ready for use.

The trap is shown attached for use with a radiator-coil in Fig. 1 by connecting the trap close up to the coil with the pipe or coupling C and attaching the return-pipe L to the plug K, and in use steam is admitted to the radiator-coil through the pipe N by opening the valve $n$, and such steam passes through the coil in the usual manner. The normal position of the eduction-valve H, when the steam is off the trap, is open, and the valve is held open by the action of the weight $g^3$, which pulls the lifting-lever G down at the weight end and raises the fork $g'$, lifting the valve H through the connecting-link $k$, for which purpose the weight $g^3$ has sufficient power to overcome the weight of the valve H and the link $k$, and the normal position of the stem E is horizontal, as shown in Fig. 3, when the pressure is off the trap.

The admission of steam to the radiator-coil M forces the air out of the coil into the chamber B, and as this air is not under much pressure and moves slowly it will not act to close down the valve H, which remains open, allowing the air to pass into the educting-passage J and thence out through the return-pipe L, so that the trap acts as an air-vent to escape the air from the radiator-coil. The steam as it enters the chamber B will be under pressure sufficient to drive through the opening $i$ and impinge on the upper face of the valve $h'$, and this pressure and the pressure on the upper face of the valve $h$ is greater than the pressure on the under faces of the valves $h$ and $h'$ and is sufficient to overcome the power of the weight $g^3$ and will close down the valve H as a whole, closing the eduction-passage. The water of condensation formed in the radiator-coil M flows into the pipe or coupling C into the chamber and rises in such chamber, and when the water reaches the point indicated by the lines in Fig. 1 the further rise of the water raises the float D, lifting the stem E, and as the stem E rises the pin $j''$ acts and lifts the valves $h$ and $h'$ from their respective seats for the water to flow through the openings $i$ and $i'$ into the eduction-passage J and enter the pipe L to return to the receiver or other receptacle for water of condensation, and when the valve H is open the water surrounds the wall or casing I and forms a seal against the passage of the steam into the eduction-passage and return-pipe, and by this means steam is held from entering the return-pipe. The water of condensation, entering the chamber B, strikes against the screen O, and the sediment in the water will be caught by the screen and deposited at the bottom of the chamber P, and such catching and depositing of the sediment are assured by the set of the screen O, so that no sediment can pass into the chamber B to get beneath either valve $h$ or $h'$ and hold the valve against closing down, and by having the screen extend across the chamber and from top to bottom and at an inclination it will be seen that the water strikes against the screen and the sediment must also strike against it and be thrown down, which would not be the case with a screen set beneath the eduction-pipe and into which the water flowed, as the screen in such case would be liable to pass more or less of the sediment. The closing down of the valve $n$ shuts off the supply of steam to the radiator-coil and the pressure becomes gradually reduced in the chamber B. The water in the coil, after the steam is off, as the steam therein condenses, will continue to flow into the chamber B, and not therefrom at the eduction-passage, and when the coil is empty the water in the chamber B will continue to flow out at the eduction-passage, gradually falling in the chamber, and with such falling of the water the float will descend, and its descent will carry down the stem E, gradually closing the valve H, and when the float has descended to the position shown in Fig. 4 the valve H will be entirely closed, holding the water in the chamber B at the point indicated by the lines in Fig. 4; but such closing down of the valve H cannot occur, because as the pressure in the chamber B is reduced the weight $g^3$ acts and holds up the fork end of the lifting-lever G against the weight of the valve H and the chamber, keeping the valve H raised and the eduction open for the water to escape from the chamber B until the bottom line of the wall or casing I is reached. The valve H will be held open by the lifting-lever until steam is again admitted to the radiator-coil, forcing the air out at the eduction-passage and closing the valve H, when steam enters the chamber B, as already described. The operation of the lifting-lever in holding the valve open is automatic, and the float and its stem, as the pressure is reduced in the trap and the water in the chamber B lowers, will descend until the stem E rests on the bottom of the slot $f$, holding the float and stem against further descent, and in the position shown in Fig. 4, and in this position of the stem the valve is held up by the lifting-lever, and such action is had by the slot $j'$ and the space between the stem E and the valve H, which permits the valve H to be raised sufficiently to open the eduction without lifting the stem E. It will thus be seen that the eduction-valve is held open in and of itself without raising the float and its stem, so that the weight $g^3$ is only required to have the power necessary to overcome the weight of the valve H and the link $k$ and a given amount of pressure in the chamber B, which can be a nominal pressure or none at all.

This trap will be found especially desirable for use with a radiator-coil, and can be set at the return or discharge end of such coil, and its use will dispense with the use of a shut-off valve for the return-pipe as now used on radiator-coils, and will also dispense with the necessity of an air-vent for the coil, as the air in the coil can escape through the trap by reason of the open eduction-valve, which does not close until the steam enters the chamber B, thus giving a free and open air-vent. The entrance of steam into the chamber B at once acts and closes the eduction-valve, preventing the escape of steam into the return-pipe L, and by closing the return-pipe against the admission of steam will cause a great saving in the amount of steam used, because there is no free communication between the radiator and return-pipe, as is the case with the ordinary shut-off valve, and with such valve the return-pipe must fill with steam its full length, so that in the case of a long return-pipe more steam is used in such pipe than in the radiator and without any beneficial effect from the heat, causing a great waste of steam, and such waste is entirely avoided by the use of the trap, which holds the steam in the coil where the steam alone is used, thus making a great saving in fuel, as less steam is required for the radiator-coil alone than with such coil and an open return-pipe, and the smaller the supply of steam required the less amount of fuel used.

The water of condensation, if any accumulates in the radiator-coil when the supply of steam is shut off or the pressure reduced, will be discharged, as under such conditions the eduction-passage is open through the action of the lifting-lever, so that with the admission of steam the water has a free escape through the eduction-passage; but as the eduction-passage is open water of condensation is not liable to accumulate in the radiator-coil, as it can escape through the eduction-passage of the trap after the steam is off or the pressure is reduced, and if no water of condensation remains in the coil the cracking and thumping which now occurs in radiator-coils by the contact of steam with the water will not occur. The water of condensation remaining in a coil will freeze in cold weather, and this often causes serious damage, in some cases even bursting the pipes, and in any case requiring to be thawed out; but by the using of the trap no freezing to cause damage can occur, as but little water remains in the trap and such water is below the eduction-passage and below the float, so that the float is free and cannot be frozen down so as not to rise with the water of condensation in the trap.

The trap is self-acting in every respect and can be used in any place where a trap is required, and in use will perform its work in an efficient and reliable manner, and at the same time is automatic in respect to the opening and closing of the eduction-passage, and in the operation of keeping the eduction-valve open when the pressure is off the trap or reduced the float can assume its normal position without affecting the operation of the lifting-lever in maintaining the eduction-valve open, and with the opening of the eduction-valve by the rise of the float such operation does not affect the condition of the lifting-lever in its action on the eduction-valve, the result being that both the float and the lifting-valve are free to operate each independent of the other, and the operation of both will be automatic.

The carrying of the wall J by the plug K enables the induction-passage to be entered from the outside of the casing, and by having the pivoting-ears $m$ and support $f''$ on the wall I and in a center line one with the other, and in a center line with the inlets or openings $i$ and $i'$, the post F, when in position, must center with the inlet-openings, and as this post F has mounted thereon in the slot $f$ the lifting-lever G, and this slot $f$ also guides the stem E, and the stem E carries the valve H, and as the slot $f$ is in the center line with the inlet-openings, it follows that the float-stem, the lifting-lever, and the valve H must be in the same line, so that whether the post F is straight vertically or not the other parts will correspond to and be in the same relative position, so that no binding between the post and the stem E can possibly occur, and the eduction-valve and the openings $i$ and $i'$ will always be in line, thereby insuring the proper seating of the valves $h$ and $h'$, the result being a proper adjustment and relation of the parts without any difficulty.

What I claim as new, and desire to secure by Letters Patent, is—

1. The combination, in a trap, of a float-actuated eduction-valve and a lifting-lever automatically operating when the float is down to hold the valve open to escape the water of condensation without lifting the float when the pressure is off the trap, substantially as specified.

2. The combination, in a trap, of an eduction-valve, a float moving a stem to open the valve when the pressure is on the trap, and a lifting-lever automatically operating to raise and hold the valve open without raising the float when the pressure is off the trap and the float is down, substantially as and for the purposes specified.

3. The combination, in a trap, of a float, a stem for the float-actuating and eduction valve for the water of condensation, and a lifting-lever automatically operating to raise and hold the float-actuated eduction-valve open when the pressure is off the trap without raising the float-stem, substantially as and for the purposes specified.

4. The combination, in a trap, of a float, a stem for the float, an eduction-valve operated by the stem through the rising and falling of the float, and a lifting-lever connected with the eduction-float-actuated eduction-valve and automatically operating to raise and hold the valve open when the pressure is off the trap independently of the float and its stem, substantially as and for the purposes specified.

5. The combination, in a trap, of a float, a stem for the float, an eduction-valve operated by the stem, an eduction-opening controlled by the valve, and a lifting-lever connected with the float-actuated eduction-valve and automatically operating to raise and hold the valve open when the pressure is off the trap independently of the float and its stem, substantially as and for the purposes specified.

6. The combination, in a trap, of a float-actuated eduction-valve and a weighted lever acting on such eduction-valve independent of the float to automatically raise and hold the valve open when the pressure is off the trap, substantially as and for the purposes specified.

7. The combination, in a trap, of a float, a stem for the float, an eduction-valve operated by the stem, and a weighted lever connected with the float-actuated valve and automatically operating to raise and hold such valve open independent of the float when the pressure is off the trap, substantially as and for the purposes specified.

8. The combination, in a trap, of a float, a stem for the float, an eduction-valve operated by the float and stem and formed of an upper and lower valve, an eduction-passage having an upper and lower inlet controlled by the eduction-valve, and a weighted lever connected with the float-actuated eduction-valve for opening the eduction-passage independently of the float and stem, substantially as and for the purposes specified.

9. The lifting-lever G, having the weight $g^3$, in combination with the float-actuated eduction-valve H, ears $j$, and link $k$ for automatically opening the valve H, substantially as and for the purposes specified.

10. The float D, stem E, and eduction-valve H, operated by the float D and stem E when the pressure is on the trap, in combination with the weighted lever G, operating to hold the valve open independently of the float and stem when the float is down and the pressure off the trap, substantially as and for the purposes specified.

11. The float D, stem E, and guide-post F, in combination with the weighted lever G, pivotally mounted in the post F over the float-stem E, and eduction-valve H, connected with the float-stem E and with the weighted lever G for opening and closing the eduction-valve by the rising and falling of the stem E and opening such valve independent of the stem E by the weighted lever G, substantially as and for the purposes specified.

12. The float D, stem E, eduction-valve H, having the ears $j$, each with a slot $j'$, and pin $j''$ on the stem E, connecting the valve H with the stem E, in combination with the weighted lever G and link $k$ between the lever G and eduction-valve H for opening the valve independent of the float, substantially as and for the purposes specified.

13. The float D, stem E, pivoting-ears $m$ for the stem E, post F, ear $f''$, supporting the post F, and eduction-valve H, having a loose connection with the stem E, in combination with the wall I, having the eduction-passage J, plug K, ear $f''$, and ears $m$, with the wall, plug, and ears formed integral, for securing the eduction-passage in position and supporting the actuating parts in line, substantially as specified.

14. The float D, stem E, pivoting-ears $m$ for the stem E, post F, ear $f''$, supporting the post F, lifting-lever G, mounted on the post F, and eduction-valve H, loosely connected with the stem E and pivotally connected with the lifting-lever G, in combination with the wall I, eduction-passage J, and plug K for entering the eduction-passage in position and carrying the actuating parts in line, substantially as specified.

15. The wall I, having a pivoting-point for a float-stem and a support for a guide-post for the stem, and a plug K, carrying the wall, in combination with a float-stem pivoted to the wall at the pivoting-point therefor, and a guide-post for the stem mounted on the support therefor on the wall for entering the wall in the chamber of the trap and maintaining the pivotal point for the stem and the guide-post in line when once adjusted, substantially as and for the purposes specified.

FRANK G. PROCUNIER.

Witnesses:
O. W. BOND,
JNO. C. MACGREGOR.